United States Patent
Rodriguez Salinas et al.

(10) Patent No.: US 10,553,370 B2
(45) Date of Patent: Feb. 4, 2020

(54) METHODS OF MAKING LIGHT-WEIGHT, LOW-RESISTIVITY TRANSFER MATERIALS

(71) Applicant: Siemens Industry, Inc., Alpharetta, GA (US)

(72) Inventors: Juan Jose Rodriguez Salinas, Monterrey (MX); Eduardo Jimenez Gonzalez, San Pedro Garza Garcia (MX)

(73) Assignee: Siemens Industry, Inc., Alpharetta, GA (US)

(*) Notice: Subject to any disclaimer, the term of this patent is extended or adjusted under 35 U.S.C. 154(b) by 61 days.

(21) Appl. No.: 15/720,808

(22) Filed: Sep. 29, 2017

(65) Prior Publication Data
US 2019/0006127 A1 Jan. 3, 2019

Related U.S. Application Data

(60) Provisional application No. 62/525,778, filed on Jun. 28, 2017.

(51) Int. Cl.
| | | |
|---|---|---|
| *H01H 11/00* | (2006.01) | |
| *H01H 1/02* | (2006.01) | |
| *B22F 7/00* | (2006.01) | |
| *B22F 1/00* | (2006.01) | |
| *B22F 3/16* | (2006.01) | |
| *H01H 11/04* | (2006.01) | |
| *H01H 11/06* | (2006.01) | |

(Continued)

(52) U.S. Cl.
CPC ............ *H01H 1/02* (2013.01); *B22F 1/0025* (2013.01); *B22F 3/16* (2013.01); *B22F 7/008* (2013.01); *C22C 1/1084* (2013.01); *C22C 26/00* (2013.01); *H01H 1/027* (2013.01); *H01H 11/048* (2013.01); *H01H 11/06* (2013.01); *B22F 3/12* (2013.01); *B22F 2301/052* (2013.01); *B22F 2302/403* (2013.01); *B22F 2998/10* (2013.01); *B22F 2999/00* (2013.01); *B82Y 10/00* (2013.01); *B82Y 30/00* (2013.01); *B82Y 40/00* (2013.01); *B82Y 99/00* (2013.01); *C22C 2026/002* (2013.01); *H01H 71/08* (2013.01); *H01H 71/524* (2013.01); *H01H 2300/036* (2013.01); *Y10T 29/49105* (2015.01)

(58) Field of Classification Search
CPC ...... B82Y 30/00; B22F 9/04; B22F 2301/052; B22F 2302/403; C22C 1/1084; C22C 2026/002; C22C 49/06; Y10T 29/49105
USPC ........................................ 29/622, 592.1, 825
See application file for complete search history.

(56) References Cited

U.S. PATENT DOCUMENTS

| | | | |
|---|---|---|---|
| 8,257,677 B2* | 9/2012 | Berkei | B82Y 30/00 423/445 B |
| 2009/0269573 A1* | 10/2009 | Omori | B82Y 30/00 428/323 |
| 2013/0237404 A1* | 9/2013 | Lee | C22C 1/0416 501/153 |

* cited by examiner

*Primary Examiner* — Thiem D Phan

(57) ABSTRACT

In some embodiments, a method is provided that includes (1) providing aluminum; (2) providing carbon nanotube material; (3) combining the aluminum and carbon nanotube material to form a current-carrying, aluminum-carbon-nanotube component of an electrical switch device; and (4) assembling the electrical switch device using the aluminum-carbon-nanotube component. The aluminum-carbon-nanotube component is formed so as to have at least one of lower electrical resistivity and greater thermal conductivity than a component formed of aluminum without carbon nanotube material. Numerous other embodiments are provided.

16 Claims, 5 Drawing Sheets

(51) Int. Cl.
*C22C 1/10* (2006.01)
*C22C 26/00* (2006.01)
*H01H 1/027* (2006.01)
*B82Y 40/00* (2011.01)
*B82Y 30/00* (2011.01)
*B82Y 99/00* (2011.01)
*B22F 3/12* (2006.01)
*B82Y 10/00* (2011.01)
*H01H 71/08* (2006.01)
*H01H 71/52* (2006.01)

METHODS OF MAKING LIGHT-WEIGHT, LOW-RESISTIVITY TRANSFER MATERIALS

RELATED APPLICATION

This non-provisional U.S. patent application claims the benefit of U.S. provisional application 62/525,778, filed 28 Jun. 2017, and entitled "Enhancing Thermal and Electrical Properties of Aluminum by Mixing Nano Particles," which is hereby incorporated by reference herein in its entirety for all purposes.

FIELD

The present disclosure relates to the use of nanotechnology to enhance the electrical and thermal properties of different metals such as aluminum.

BACKGROUND

Conventionally, copper was used as a transfer material to ensure the transfer of an electrical current inside a circuit breaker. Copper has a desirably low resistivity for use in circuit breakers and other electrical equipment. The low resistivity of copper enables it to conduct large electrical currents with relatively low heat losses. However, copper is a dense and expensive metal which, in turn, makes circuit breakers that include copper as a transfer material heavy and expensive.

A well-known alternative to copper for conducting electrical currents is aluminum. Aluminum is less expensive than copper, but more electrically resistive than copper. In order to achieve the same or similarly low resistance of a transfer material made of copper, transfer material made of aluminum requires approximately 30% more aluminum to conduct the same amount of current as a given amount of copper. Because aluminum is less dense than copper, substituting aluminum for copper requires more physical space to achieve the same resistance. Methods and apparatus that reduce the weight and cost of circuit breakers are desirable.

SUMMARY

In some embodiments, a method is provided that includes (1) providing aluminum; (2) providing carbon nanotube material; (3) combining the aluminum and carbon nanotube material to form a current-carrying, aluminum-carbon-nanotube component of an electrical switch device; and (4) assembling the electrical switch device using the aluminum-carbon-nanotube component. The aluminum-carbon-nanotube component is formed so as to have at least one of lower electrical resistivity and greater thermal conductivity than a component formed of aluminum without carbon nanotube material.

In some embodiments, a method is provided of assembling a circuit breaker that includes (1) disposing a first amount of a powdered aluminum and a second amount of a carbon-based material in a ball milling machine; (2) ball milling the first amount of the powdered aluminum and the second amount of the carbon-based material to form a mixture; (3) disposing a first portion of the mixture in a first mold, and a second portion of the mixture in a second mold; (4) sintering the first portion of the mixture in the first mold to form a first electrically conductive structure having a first shape, and sintering the second portion of the mixture in the second mold to form a second electrically conductive structure having a second shape; and (5) disposing the first electrically conductive structure and the second electrically conductive structure within a housing of the circuit breaker.

In some embodiments, a circuit breaker is provided that includes (1) a stationary contact configured to electrically connect with a line connector; and (2) a movable contact configured to electrically connect with the stationary contact by direct physical contact. The stationary contact comprises aluminum and carbon nanotubes, and the movable contact comprises aluminum and carbon nanotubes.

Other features and aspects of the present disclosure will become more fully apparent from the following detailed description, the claims, and the accompanying drawings.

DETAILED DESCRIPTION

The materials, components, and assemblies described herein as making up the various embodiments are intended to be illustrative and not restrictive. Many suitable materials and components that would perform the same or a similar function as the materials and components described herein are intended to be embraced within the scope of embodiments of the present disclosure.

The use of carbon-based nanoparticles such as carbon nanotubes (CNT), or graphene, in a matrix of aluminum may beneficially modify the electrical and/or thermal properties of aluminum as those properties relate to replacing copper in various electrical assemblies. Various embodiments of this disclosure modify the properties of aluminum metal by varying the concentrations of carbon-based nanoparticles incorporated with the aluminum, or by varying the process conditions in the method of incorporating carbon-based nanoparticles with aluminum. Various embodiments of the present disclosure may incorporate one or more carbon-based nanoparticles from the fullerene family of molecules.

Various embodiments of this disclosure provide electrical assemblies, such as electrical switching apparatus, wherein one or more of their electrical current carrying components, referred to as transfer materials, are comprised of aluminum with carbon-based nanoparticles incorporated therein. Such transfer materials advantageously have reduced electrical resistivity and/or increased thermal conductivity.

In various embodiments, the incorporation of carbon-based nanoparticles provides a transfer material that has greater electrical conductivity than conventional aluminum, and thus less material is needed to achieve an equivalent electrical resistance. This permits less expensive products, such as for example electrical assemblies, to be produced with less material in the electrical current path. In turn, this may result in smaller products without diminishing the magnitude of the electrical current capable of being handled.

In some embodiments, methods of producing aluminum with improved electrical and/or thermal properties include one or more ball milling operations. Ball milling, in accordance with this disclosure, mixes carbon-based nanoparticles, e.g., carbon nanotubes, into a powdered aluminum matrix, thereby creating a new metal composite. Then the new metal composite material is formed into the desired shape by using one or more powder metallurgy processes, including, but not limited to a press and sinter process.

Figure 1:
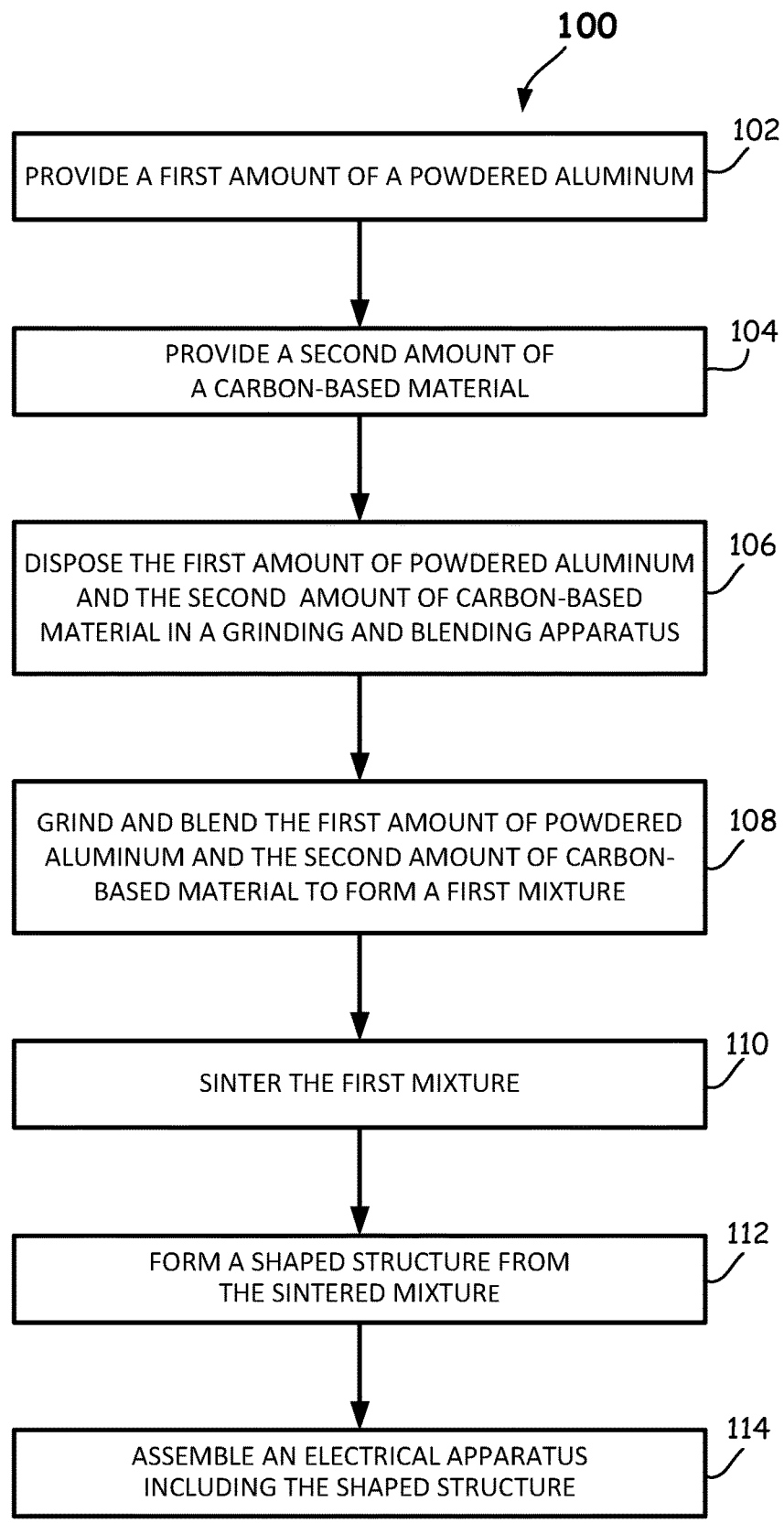
FIG. 1 illustrates a flow diagram of a method of producing a transfer material with enhanced thermal and electrical properties as compared to aluminum in accordance with one illustrative embodiment of this disclosure.

FIG. 1 illustrates a flow diagram of method 100 of producing a transfer material with enhanced thermal and/or electrical properties as compared to aluminum in accordance with one illustrative embodiment of this disclosure.

In one illustrative embodiment, the method 100 of manufacturing light-weight, low-resistivity transfer materials for electrical apparatus includes providing 102 a first amount of a powdered aluminum, providing 104 a second amount of a carbon-based material, disposing 106 the first amount of the powdered aluminum and the second amount of the carbon-based material in a grinding and blending apparatus, grinding and blending 108 the first amount of the powdered aluminum and the second amount of the carbon-based material to form a mixture, sintering 110 the mixture, forming 112 a shaped structure from the sintered mixture, and assembling 114 an electrical apparatus including the shaped structure.

In some embodiments, the carbon-based material may be single-walled carbon nanotubes and/or multi-walled carbon nanotubes. In the some embodiments some or all of the CNTs may be chemically functionalized (e.g., chemically modified to improve characteristics such as solubility by opening ends of the carbon nanotubes and/or forming function groups, such as carboxyl groups, at defect locations).

In one or more embodiments, the grinding and blending apparatus may be a ball-milling machine. Grinding and blending that is performed by a ball milling machine may be referred to as ball milling. In some embodiments ball milling is performed as a batch process, and in other embodiments ball milling is performed as a continuous process. In various example embodiments ball milling includes using balls comprising about 15 steel balls of about 5 mm, and about 4 steel balls of about 10 mm. Other types, numbers and/or sizes of balls may be used.

In some embodiments, the powdered aluminum has a purity in the range of about 90% pure to 99% pure; the multi-walled carbon nanotubes have average dimensions of about 130 nm to 170 nm outer diameter, about 100 nm to 120 nm internal diameter, and about 5 μm to 9 μm in length; and the single-walled carbon nanotubes have average dimensions of about 9 nm to 15 nm outer diameter, about 7 nm to 12 nm internal diameter, and about 0.5 μm to 10 μm in length. Other purity levels, outer diameters, inner diameters and/or lengths may be used.

In various embodiments, between 0.1 wt. % and 2.0 wt. % CNTs are combined with the powdered aluminum. For example, nominally 1.0 wt. % multi-walled carbon nanotubes and/or nominally 0.5 wt. % single-walled carbon nanotubes may be combined with the powdered aluminum. Other amounts of multi- and/or single-walled carbon nanotubes may be employed.

In some embodiments, the distribution of the CNT concentration throughout the volume of the ball-milled aluminum powder and carbon nanotube mixture is nominally uniform.

Sintering may include heating a predetermined amount of the ball-milled mixture of powdered aluminum and single- and/or multi-walled CNTs to a temperature within the range of about 550° C. to 600° C., and maintaining that temperature for a period within the range of about 30 minutes to 60 minutes, in an ambient including but not limited to argon or nitrogen. In some embodiments, sintering may include applying pressure in the range of about 15 Ton to 20 Ton during the application of heat. In some embodiments, pressure in the range of about 15 Ton to 20 Ton may be applied to the ball-milled mixture prior to sintering. In one or more embodiments, the ball-milled aluminum powder and carbon nanotube mixture may be placed or pressed into a mold prior to the application of heat. The mold may provide a shape for the sintered material.

In some embodiments, the distribution of the CNT concentration throughout the volume of the sintered mixture of powdered aluminum and carbon nanotubes is nominally uniform.

In some embodiments, the shaped sintered material may be used as a component of an electrical apparatus or assembly, such as but not limited to an electrical circuit breaker.

Figure 2:
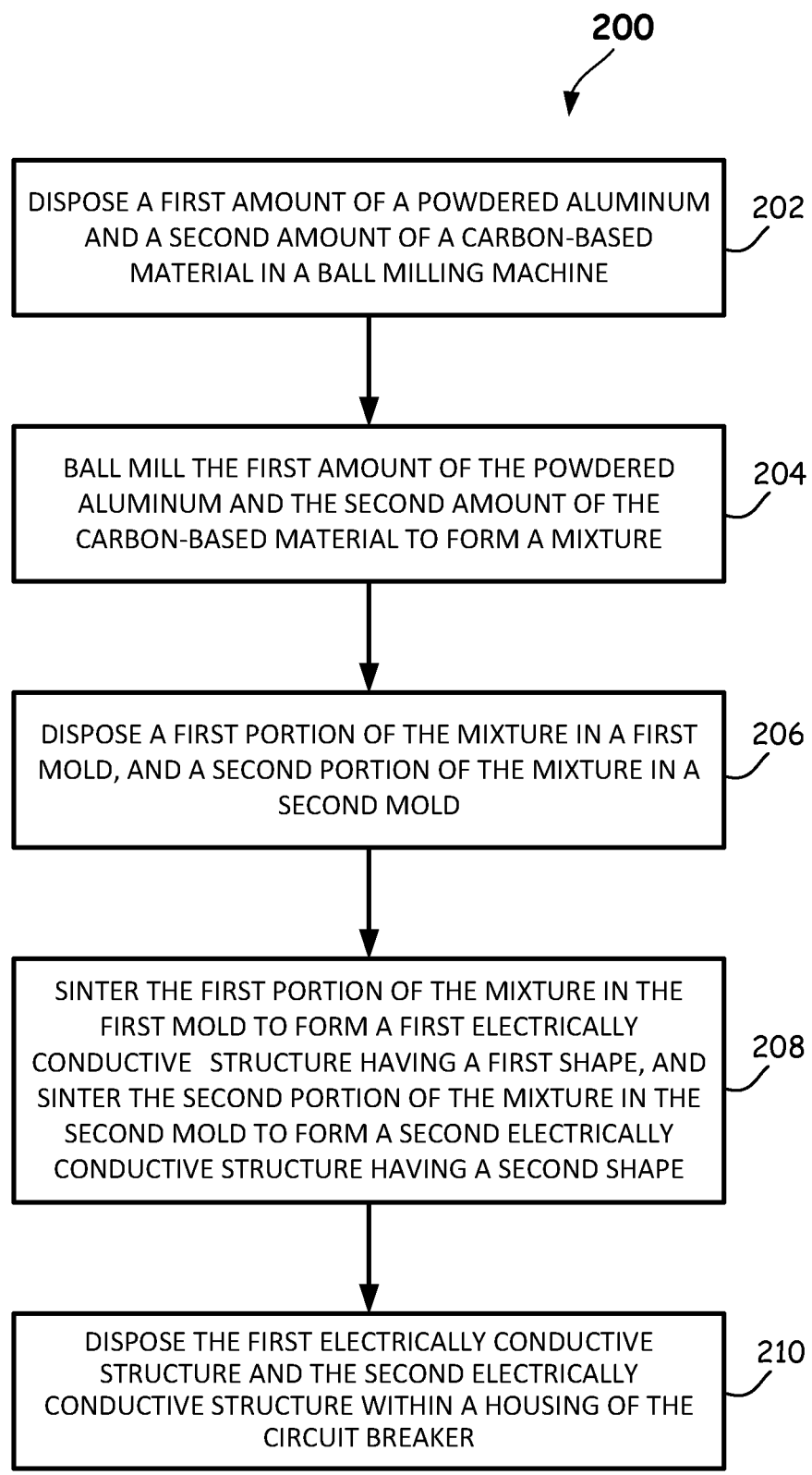
FIG. 2 illustrates a flow diagram of a method of assembling a circuit breaker in accordance with one illustrative embodiment of this disclosure.

FIG. 2 shows a flow diagram of a method 200 of assembling a circuit breaker in accordance with one illustrative embodiment of this disclosure.

In one example embodiment, the method 200 of assembling a circuit breaker, includes disposing 202 a first amount of a powdered aluminum and a second amount of a carbon-based material in a ball milling machine, ball milling 204 the first amount of the powdered aluminum and the second amount of the carbon-based material to form a mixture, disposing 206 a first portion of the mixture in a first mold, and a second portion of the mixture in a second mold, sintering 208 the first portion of the mixture in the first mold to form a first electrically conductive structure having a first shape, and sintering the second portion of the mixture in the second mold to form a second electrically conductive structure having a second shape, and disposing 210 the first electrically conductive structure and the second electrically conductive structure within a housing of the circuit breaker. In some embodiments the carbon-based material may be selected from one or more fullerenes, such as but not limited to, single-walled carbon nanotubes, multi-walled carbon nanotubes, and graphene.

In some embodiments, the first mold is configured to produce the shape of a stationary contact of a circuit breaker, and the second mold is configured to produce the shape of a movable contact of the circuit breaker. In this way, the first electrically conductive structure is, or is the precursor to, a stationary contact of a circuit breaker, and the second electrically conductive structure is, or is the precursor to, a movable contact of a circuit breaker. Alternatively, the first mold and the second mold may each be configured to produce any component of the circuit breaker that is comprised of the above-mentioned aluminum enhanced with carbon-based material, such as but not limited to one or more fullerenes, single-walled carbon nanotubes, multi-walled carbon nanotubes, and graphene.

In some embodiments, ball milling 204 is a batch process, and in alternative embodiments, ball milling 204 is a continuous process.

In some embodiments, ball milling 204 includes using balls of a first size and powdered aluminum particles of a second size, wherein the ratio of the first size to the second size is in a range between about 25:1 and 10:1.

Figure 3:
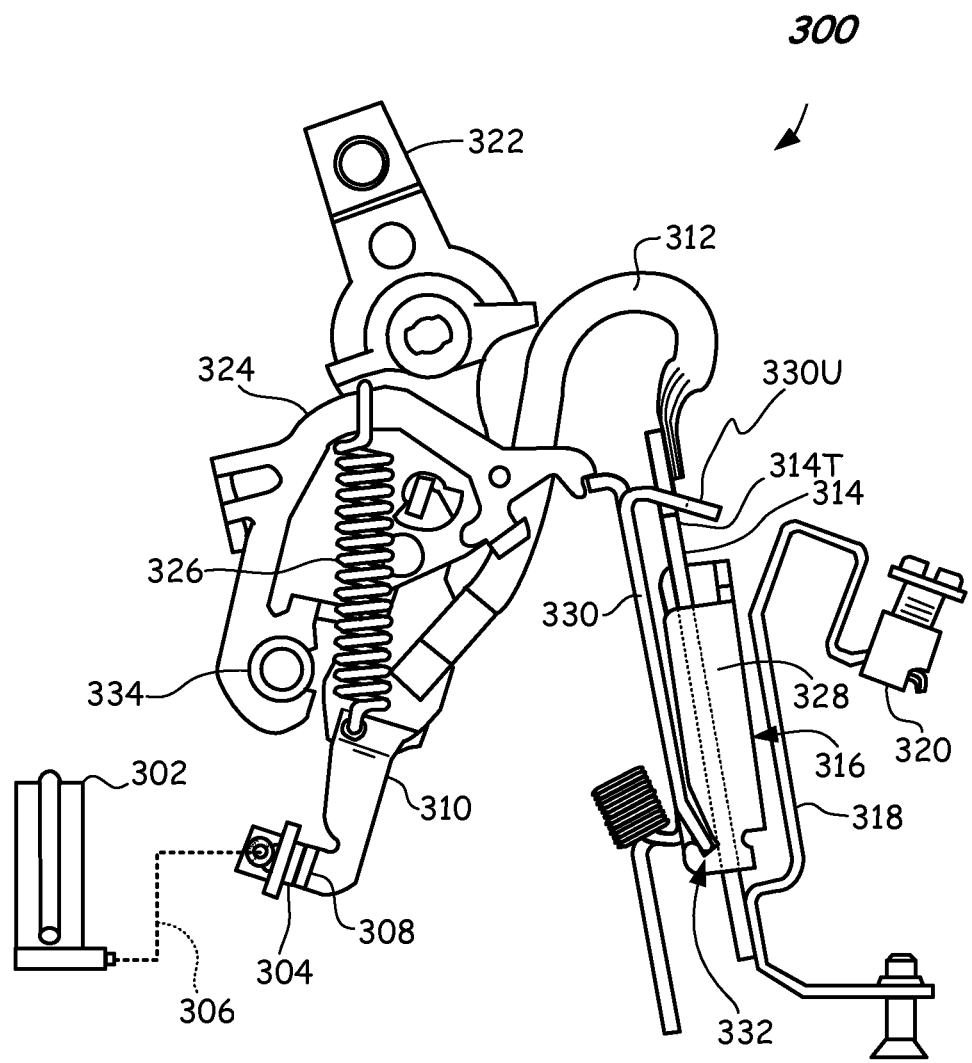
FIG. 3 is a side view of a tripping mechanism of an example circuit breaker in accordance with this disclosure, with some other circuit breaker components (e.g., housing) removed for clarity.

FIG. 3 illustrates a side view of a tripping mechanism of an example circuit breaker in accordance with this disclosure, with some other circuit breaker components (e.g., molded case housing) removed for clarity.

Various embodiments of this disclosure concern providing improved transfer materials in an electrical apparatus or assemblies such as, but not limited to a circuit breaker. The improved transfer materials may have, for example, reduced resistivity, and/or increased thermal conductivity as compared to aluminum.

An example configuration of a tripping mechanism 300 of a circuit breaker and other operating mechanism components thereof is shown in FIG. 3. Line power (on a line side) is connectable to a line connector 302 of the circuit breaker. Line connector 302 may be electrically connected to a stationary contact 304 by a wire conductor 306. Line connector 302 to line power may be different for different circuit breaker styles. For a plug-in type circuit breaker, line connector 302 can be a spring clip (as shown), and for a bolt-on type circuit breaker, it can be a metal strip with pre-designed screw holes therein, for example. In some embodiments, the stationary contact 304 may be directly attached to the Line connector 302.

Contact between the stationary electrical contact 304 and a moveable electrical contact 308 passes electrical current through a contact arm 310, through a flexible (e.g., braided) conductor 312 coupled to the contact arm 310, through a bimetal strip 314 of a bimetal and magnet assembly 316, and through a load conductor 318 to a load terminal 320. An electrical load may be connected at the load terminal 320.

Other than the current path mentioned above, a circuit breaker may also include an operating mechanism which includes a handle 322, a cradle 324, a spring 326, a magnet 328 of the bimetal and magnet assembly 316, and an armature 330. A user can throw the handle 322 to manually separate the stationary and moveable electrical contacts 304, 308, or if a circuit fault happens, the armature 330 may be rotated clockwise about an armature pivot 332 to de-latch the cradle 324. The cradle 324 is then rotated clockwise about a cradle pivot 334 by the action of spring 326, which in turn rotates the contact arm 310 to separate the stationary and moveable electrical contacts 304, 308.

For traditional thermal-magnetic circuit breakers, there are two ways to trip the circuit breaker, depending upon the current levels that are present. At persistent low current levels, the bimetal strip 314 bends as it is heated up due to resistive heating and eventually causes the top end 314T of bimetal strip 314 to contact the upper portion 330U of the armature 330 and rotate the armature 330, thus de-latching the cradle 324. At high current levels (e.g., due to short circuit conditions), the magnet 328 magnetically attracts the armature 330 to de-latch the cradle 324 and ensure fast response. The current level at which the magnet 328 causes de-latching is called the "instantaneous level." Conventionally, the circuit breaker mechanism is enclosed within a housing (e.g., a molded case housing—not shown), which may include two or more parts.

In some embodiments, stationary contact 304 and/or moveable contact 308 are each manufacture from carbon-enhanced transfer materials. In some embodiments the carbon-enhanced transfer materials are aluminum with carbon nanotubes incorporated therein. In other embodiments, any one or more of the electrical current carrying components shown in FIG. 3 may be manufactured from carbon-enhanced transfer materials. For example, in one or more embodiments, the example circuit breaker of FIG. 3 may be assembled with current carrying components of carbon-enhanced transfer materials having 0.1 wt. % to 2.0 wt. % carbon nanotubes. In one or more example embodiments, stationary contact 304 may be formed from aluminum with nominally 1.0 wt. % multi-walled carbon nanotubes. Other weight percentages may be used.

Figure 4:
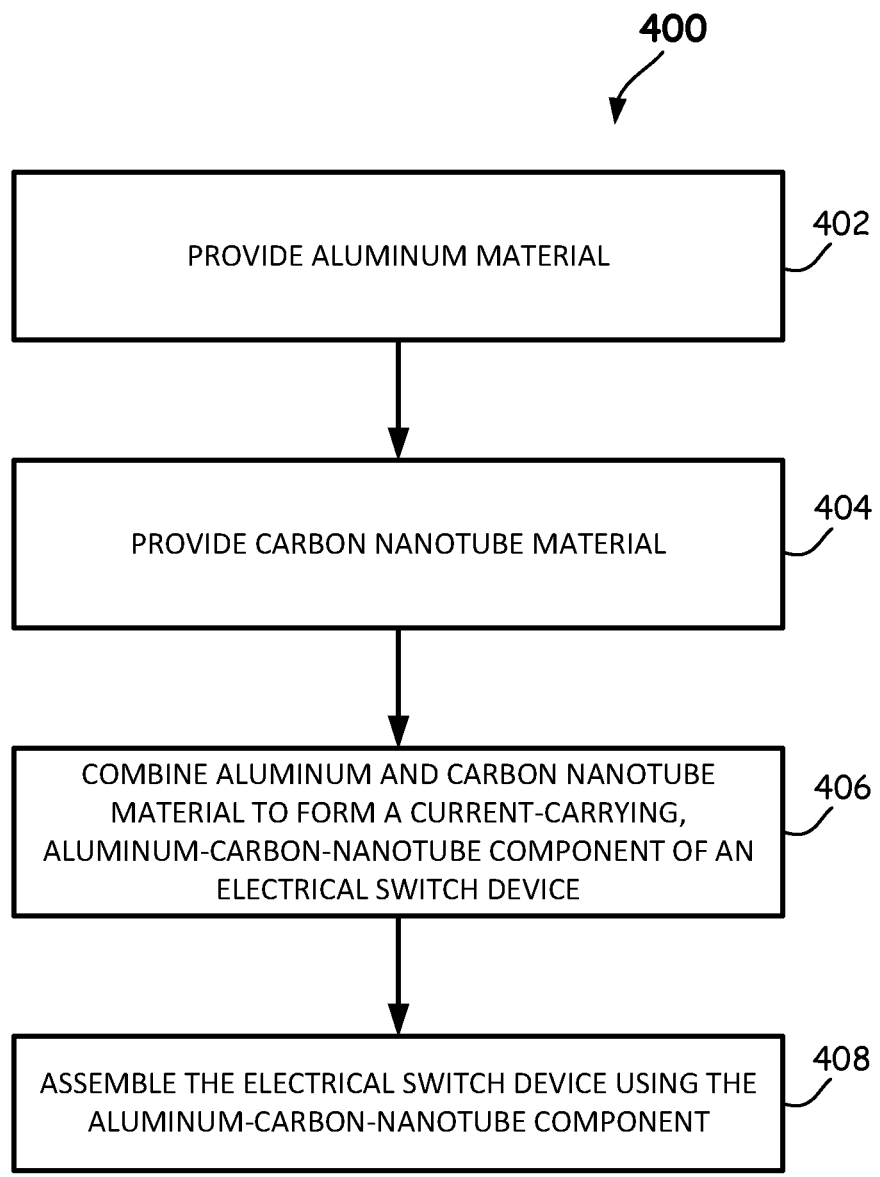
FIG. 4 illustrates a flow diagram of a method of assembling an electrical switch device in accordance with one illustrative embodiment of this disclosure.

With reference to FIG. 4, in one or more embodiments, a method 400 of forming an electrical switch device is provided. In some embodiments, an electrical switch device may include a circuit breaker (such as a single- or multiple-pole circuit breaker), an enclosed electrical switch, a rotary-based electrical switch, a snap-action switch, a rocker switch, a toggle switch, a slide switch, a knife switch, a push button switch, or the like. Aluminum-carbon-nanotube components may be used to form at least a portion of a stationary contact, a movable contact, a contact arm, a line conductor, a load conductor, a line connector, a load terminal, or the like.

With reference to FIG. 4, the method 400 includes providing 402 aluminum material and providing 404 carbon nanotube material, and combining 406 the aluminum and carbon nanotube material to form a current-carrying, aluminum-carbon-nanotube component of an electrical switch device. For example, the current-carrying, aluminum-carbon-nanotube component may be a stationary contact, a movable contact, a contact arm, a load conductor, or the like. The method 400 includes 408 assembling the electrical switch device using the aluminum-carbon-nanotube component. The aluminum-carbon-nanotube component is formed so as to have at least one of lower electrical resistivity and greater thermal conductivity than a component formed from aluminum without carbon nanotube material. For example, in some embodiments, the aluminum-carbon-nanotube component may be formed from aluminum having between about 0.5 and 2.0 wt. % of single-walled carbon nanotubes. In other embodiments, less than about 1.0 wt. %, and in some embodiments about 0.5 wt. %, of single-walled carbon nanotubes may be used. Likewise, the aluminum-carbon-nanotube component may be formed from aluminum having between about 0.5 and 2.0 wt. % of multi-walled carbon nanotubes. In other embodiments, less than about 1.0 wt. %, and in some embodiments about 0.5 wt. %, of multi-walled carbon nanotubes may be used. In one or more embodiments, the type and amount of carbon nanotube material is selected so as to provide at least one of lower electrical resistivity and greater thermal conductivity than a component formed from aluminum without carbon nanotube material. Example improvements of 20% or more in reduced electrical resistivity and/or increased thermal conductivity have been observed when components formed from aluminum and carbon nanotubes are compared to similar components formed of aluminum without carbon nanotubes. Other weight percentages may be employed.

Figure 5:
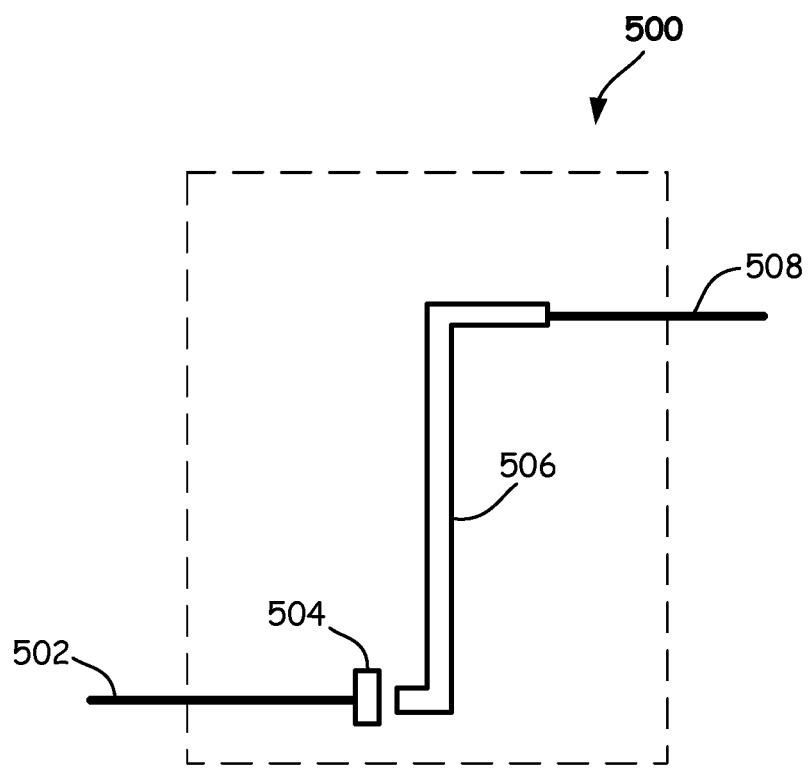
FIG. 5 is a side view of an example electrical switch device in accordance with this disclosure.

FIG. 5 is a schematic diagram of an electrical switch device 500 provided herein. Electrical switch device 500 includes a line side connector 502 coupled to a stationary contact 504 and a movable contact 506 coupled to a load side connector 508. Movement of movable contact 506 into contact with stationary contact 504 creates a current path from line-side connector 502 to load-side connector 508. Movement of movable contact 506 may include one or more of rotation, pivoting, flexing, translation, or combinations, for example. Electrical switch device 500 may be, for example, a circuit breaker (such as a single- or multiple-pole circuit breaker), an enclosed electrical switch, a rotary-based electrical switch, a snap-action switch, a rocker switch, a toggle switch, a slide switch, a knife switch, a push button switch, or the like. In some embodiments, one or more of a line-side connector 502, stationary contact 504, movable contact 506 and/or load-side connector 508 may be an aluminum-carbon-nanotube component as described herein.

In one example embodiment, a circuit breaker includes a stationary contact configured to electrically connect with a line connector through a wire conductor, a movable contact configured to electrically connect with the stationary contact by direct physical contact, i.e., touching, wherein the stationary contact comprises aluminum, and carbon nanotubes, and the movable contact comprises aluminum, and carbon nanotubes. In various embodiments, the carbon nanotubes may be single-walled carbon nanotubes, multi-walled carbon nanotubes, or a combination thereof. In other embodiments, either one or both of the single-walled carbon nanotubes and the multi-walled carbon nanotubes may be functionalized carbon nanotubes.

The term "nominal" as used herein refers to a desired, or target, value of a characteristic, measurement, weight, or other parameter for a component, product, or process, together with a range of values above and/or below the desired value. The range of values is typically due to slight variations in manufacturing processes or tolerances.

Although the terms first, second, etc., may be used herein to describe various elements, components, regions, parts or sections, these elements, components, regions, parts or sections, should not be limited by these terms. The terms may be used to distinguish one element, component, region, part or section, from another element, component, region, part or section. For example, a first element, component, region, part or section discussed above could be termed a second element, component, region, part or section without departing from the teachings of the present disclosure.

While embodiments of this disclosure have been disclosed in example forms, it will be apparent to those skilled in the art that many modifications, additions, and deletions can be made therein without departing from the scope of this disclosure, as set forth in the claims and their equivalents.

What is claimed is:

1. A method, comprising:
   providing aluminum;
   providing carbon nanotube material;
   combining the aluminum and carbon nanotube material to form a current-carrying, aluminum-carbon-nanotube component of an electrical switch device, wherein combining the aluminum and carbon nanotube material comprises:
   providing a first amount of a powdered aluminum;
   providing a second amount of a carbon-based material, wherein providing the second amount of the carbon-based material comprises:
      providing the second amount of multi-walled carbon nanotubes, and
      wherein the multi-walled carbon nanotubes have average dimensions of 130 nm to 170 nm outer diameter, 100 nm to 120 nm internal diameter, and 5 μm to 9 μm in length;
   disposing the first amount of the powdered aluminum and the second amount of the carbon-based material in a grinding and blending apparatus;
   grinding and blending the first amount of the powdered aluminum and the second amount of the carbon-based material to form a mixture;
   sintering the mixture to form a sintered mixture; and
   forming a shaped structure from the sintered mixture; and
   assembling the electrical switch device using the aluminum-carbon-nanotube component, wherein the aluminum-carbon-nanotube component is formed so as to have at least one of lower electrical resistivity and greater thermal conductivity than a component formed of aluminum without carbon nanotube material.

2. The method of claim 1, wherein the second amount comprises an amount between 0.1 wt. % and 2.0 wt. %.

3. The method of claim 1, wherein the second amount comprises an amount nominally 1.0 wt. %.

4. The method of claim 1, wherein providing the second amount of the carbon-based material comprises:
   providing the second amount of single-walled carbon nanotubes;
   wherein the single-walled carbon nanotubes have average dimensions of 9 nm to 15 nm outer diameter, 7 nm to 12 nm internal diameter, and 0.5 μm to 10 μm in length.

5. The method of claim 4, wherein the second amount comprises an amount between 0.1 wt. % and 2.0 wt. %.

6. The method of claim 4, wherein the second amount comprises an amount nominally 0.5 wt. %.

7. The method of claim 1, wherein sintering comprises:
   heating the mixture to a temperature within a range of 550° C. to 600° C., for a period within a range of 30 minutes to 60 minutes, in an ambient comprising argon or nitrogen.

8. The method of claim 7, further comprising:
   applying, prior to heating the mixture, a pressure in a range of 15 Ton to 20 Ton thereto.

9. The method of claim 7, further comprising:
   applying, concurrently with heating the mixture, a pressure in a range of 15 Ton to 20 Ton to the mixture.

10. The method of claim 1, wherein grinding and blending comprises ball milling.

11. The method of claim 10, wherein ball milling comprises using balls formed from steel.

12. The method of claim 10, wherein a plurality of balls used in ball milling have a first size, a powdered aluminum particle has a second size, and a ratio of the first size to the second size is in a range of 25:1 to 10:1.

13. The method of claim 1, wherein a distribution of carbon nanotubes in the mixture prior to sintering is nominally uniform.

14. A method of assembling a circuit breaker, comprising:
   disposing a first amount of a powdered aluminum and a second amount of a carbon-based material in a ball milling machine;
   ball milling the first amount of the powdered aluminum and the second amount of the carbon-based material to form a mixture;
   disposing a first portion of the mixture in a first mold, and a second portion of the mixture in a second mold;
   sintering the first portion of the mixture in the first mold to form a first electrically conductive structure having a first shape, and sintering the second portion of the mixture in the second mold to form a second electrically conductive structure having a second shape; and
   disposing the first electrically conductive structure and the second electrically conductive structure within a housing of the circuit breaker.

15. The method of claim 14, wherein the carbon-based material comprises multi-walled carbon nanotubes; and
   wherein the multi-walled carbon nanotubes have average dimensions of 130 nm to 170 nm outer diameter, 100 nm to 120 nm internal diameter, and 5 μm to 9 μm in length.

16. The method of claim 14, further comprising:
   applying pressure to the first portion of the mixture, prior to sintering, in a range of 15 Ton to 20 Ton; and applying pressure to the first portion of the mixture, during sintering, in a range of 15 Ton to 20 Ton.

* * * * *